US011156092B2

(12) United States Patent
Reynolds et al.

(10) Patent No.: US 11,156,092 B2
(45) Date of Patent: Oct. 26, 2021

(54) MULTISTAGE AXIAL-CENTRIFUGAL COMPRESSOR SYSTEMS AND METHODS FOR MANUFACTURE

(71) Applicant: HONEYWELL INTERNATIONAL INC., Morris Plains, NJ (US)

(72) Inventors: Bruce David Reynolds, Chandler, AZ (US); Richard David Conner, Peoria, AZ (US); Michael T. Barton, Phoenix, AZ (US); Jeffrey W. Gluck, Phoenix, AZ (US); Nick Nolcheff, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 101 days.

(21) Appl. No.: 16/269,804

(22) Filed: Feb. 7, 2019

(65) Prior Publication Data
US 2020/0256192 A1 Aug. 13, 2020

(51) Int. Cl.
*F01D 5/06* (2006.01)

(52) U.S. Cl.
CPC ............ *F01D 5/06* (2013.01); *F05D 2220/32* (2013.01); *F05D 2250/70* (2013.01)

(58) Field of Classification Search
CPC ..... F01D 5/06; F05D 2220/32; F05D 2250/70
See application file for complete search history.

(56) References Cited

U.S. PATENT DOCUMENTS

| 3,357,176 A | | 12/1967 | Williams | |
|---|---|---|---|---|
| 3,448,582 A | * | 6/1969 | Bracey | F23R 3/60 60/226.1 |
| 4,506,502 A | * | 3/1985 | Shapiro | F02C 3/073 60/39.43 |
| 4,900,230 A | | 2/1990 | Patel | |

(Continued)

FOREIGN PATENT DOCUMENTS

| CN | 102734210 | 10/2012 |
|---|---|---|
| CN | 103157844 | 6/2013 |
| EP | 2020638 A1 | 2/2009 |

OTHER PUBLICATIONS

Centrifulal Compressors; Recap: Lecture 20, Oct. 13, 2015.
(Continued)

*Primary Examiner* — Michael Lebentritt
(74) *Attorney, Agent, or Firm* — Lorenz & Kopf, LLP (57) ABSTRACT

A method of manufacturing a multistage axial-centrifugal compressor for a gas turbine engine and a multistage axial-centrifugal compressor that includes a series of axial compressor stages each having a rotor mounted to a common shaft positioned upstream from a centrifugal compressor stage mounted to the common shaft. The method includes determining an operational rotor tip speed for each of the axial stages. The method includes comparing the operational rotor tip speed to a threshold range value and determining to machine an airfoil of the rotor for at least one of the axial stages by an arbitrary manufacturing approach based on the operational rotor tip speed as greater than the threshold range value. The method includes determining to machine (Continued)

an airfoil of the rotor for at least one of the axial stages by a flank manufacturing approach based on the operational rotor tip speed as less than the threshold range value.

6 Claims, 7 Drawing Sheets

(56) References Cited

U.S. PATENT DOCUMENTS

| | | | | |
|---|---|---|---|---|
| 4,930,979 | A * | 6/1990 | Fisher | F04D 29/4213 |
| | | | | 415/206 |
| 5,220,784 | A * | 6/1993 | Wilcox | B63H 21/16 |
| | | | | 416/198 A |
| 5,267,397 | A * | 12/1993 | Wilcox | B63H 21/16 |
| | | | | 29/889.1 |
| 5,594,665 | A * | 1/1997 | Walter | F04D 27/001 |
| | | | | 700/301 |
| 5,722,241 | A * | 3/1998 | Huber | F04D 29/5826 |
| | | | | 60/728 |
| 2007/0144139 | A1 * | 6/2007 | Kawamoto | F02K 3/06 |
| | | | | 60/39.092 |
| 2009/0304473 | A1 | 12/2009 | Holze et al. | |
| 2010/0263373 | A1 * | 10/2010 | Decker | F04D 29/668 |
| | | | | 60/605.1 |
| 2014/0121819 | A1 | 5/2014 | Amidon et al. | |
| 2015/0301519 | A1 | 10/2015 | Cooper et al. | |
| 2016/0238018 | A1 * | 8/2016 | Conner | F01D 9/04 |
| 2017/0058981 | A1 * | 3/2017 | Gonzalez | B64C 25/42 |
| 2017/0211586 | A1 * | 7/2017 | Gage | F04D 29/582 |
| 2018/0187690 | A1 * | 7/2018 | Reynolds | F04D 29/321 |

OTHER PUBLICATIONS

Ikeguchi, T., et al.; Design and Development of a 14-Stage Axial Compressor for Industrial Gas Turbine; Copyright © 2012 by ASME; Proceedings of ASME Turbo Expo 2012 GT2012, Jun. 11-15, 2012, Copenhagen, Denmark.

Tonshoff, H.K., et al.; Aircraft Technologies, Flank Milling Optimization—The Flamingo Project; Air & Space Europe • vol. 3 • No. 3/4 2001.

Frost, G., et al.; The Design of Axial Compressor Airfoils Using Arbitrary Chamber Lines Aerospace Research Laboratories, Wright-Patterson Air Force Base, Ohio Jul. 1973.

* cited by examiner

MULTISTAGE AXIAL-CENTRIFUGAL COMPRESSOR SYSTEMS AND METHODS FOR MANUFACTURE

TECHNICAL FIELD

The present disclosure generally relates to gas turbine engines, and more particularly relates to multistage axial-centrifugal compressor systems and methods for manufacture of a multistage axial-centrifugal compressor for a gas turbine engine.

BACKGROUND

Gas turbine engines may be employed to power various devices. For example, a gas turbine engine may be employed to power a mobile platform, such as an aircraft. Generally, gas turbine engines include one or more fans or compressors, which operate to draw air into the gas turbine engine and to raise a pressure of that air. Each of the fans and compressors has one or more airfoils that are rotatable to accomplish this task. In certain instances, in order to achieve a desired amount of efficiency for the fan or compressor, one or more of the airfoils may have a complex geometry. The complex geometry of the airfoil may require extensive manufacturing operations to form the airfoil, which may be expensive. In addition, in certain instances, the complex geometry of the airfoil may not provide a large improvement in efficiency when compared to an airfoil having a simpler geometry at a lower cost.

Accordingly, it is desirable to provide a multistage axial-compressor and methods for manufacture of the multistage axial-centrifugal compressor, in which the one or more airfoils of the multistage axial-centrifugal compressor are manufactured in a cost effective manner to provide a desired amount of efficiency through the multistage axial-centrifugal compressor. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a method of manufacturing a multistage axial-centrifugal compressor for a gas turbine engine. The multistage axial-centrifugal compressor includes a series of axial compressor stages each having a rotor mounted to a common shaft positioned upstream from a centrifugal compressor stage mounted to the common shaft. The method includes receiving, by a processor, an operating speed of the multi-stage axial centrifugal compressor and determining, by the processor, an operational rotor tip speed for each of the axial compressor stages based on the operating speed of the multi-stage axial centrifugal compressor. The method includes comparing, by the processor, the operational rotor tip speed for each of the axial compressor stages to a threshold range value and determining, by the processor, to machine an airfoil of the rotor for at least one of the axial compressor stages by an arbitrary manufacturing approach based on the operational rotor tip speed for the at least one of the axial compressor stages as greater than the threshold range value. The method includes determining, by the processor, to machine an airfoil of the rotor for at least one of the axial compressor stages by a flank manufacturing approach based on the operational rotor tip speed for the at least one of the axial compressor stages as less than the threshold range value and generating user interface data based on the determining to machine the airfoil of the rotor by the arbitrary manufacturing approach and the flank manufacturing approach for the axial compressor stages.

Also provided according to various embodiments is a multistage axial-centrifugal compressor for a gas turbine engine. The multistage axial-centrifugal compressor includes a first axial compressor stage including a first rotor mounted to a shaft. The first rotor has at least one airfoil with an arbitrary shape. The multistage axial-centrifugal compressor includes a second axial compressor stage including a second rotor mounted to the shaft. The first axial compressor stage upstream from the second axial compressor stage, and the second rotor having at least one second airfoil with a straight line shape. The multistage axial-centrifugal compressor includes a centrifugal compressor stage downstream from the second axial compressor stage including an impeller assembly coupled to the shaft. The impeller assembly has at least one third airfoil with the straight-line shape.

Further provided according to various embodiments is a system for manufacturing a multistage axial-centrifugal compressor for a gas turbine engine. The multistage axial-centrifugal compressor includes a series of axial compressor stages each having a rotor mounted to a common shaft positioned upstream from a centrifugal compressor stage mounted on the common shaft. The system includes a source of an operating speed of the multi-stage axial centrifugal compressor. The system includes a controller, having a processor, that is configured to: determine an operational rotor tip speed for each of the axial compressor stages based on the operating speed of the multi-stage axial centrifugal compressor; compare the operational rotor tip speed for each of the axial compressor stages to a threshold value; determine to machine an airfoil of the rotor for at least one of the axial compressor stages by an arbitrary manufacturing approach based on the operational rotor tip speed for the at least one of the axial compressor stages as greater than the threshold range value; determine to machine an airfoil of the rotor for at least one of the axial compressor stages by a flank manufacturing approach based on the operational rotor tip speed for the at least one of the axial compressor stages as less than the threshold range value; and generate manufacturing system data for a manufacturing system based on the determination to machine the airfoil of the rotor for the at least one of the axial compressor stages by the flank manufacturing approach and the determination to machine the airfoil of the rotor for the at least one of the axial compressor stages by the arbitrary manufacturing approach.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of multistage fan or compressor, and the multistage axial-centrifugal compressor for a gas turbine engine is merely one exemplary embodiment according to the present disclosure. In addition, while the multistage axial-centrifugal compressor is described herein as being employed with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the manufacturing system described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
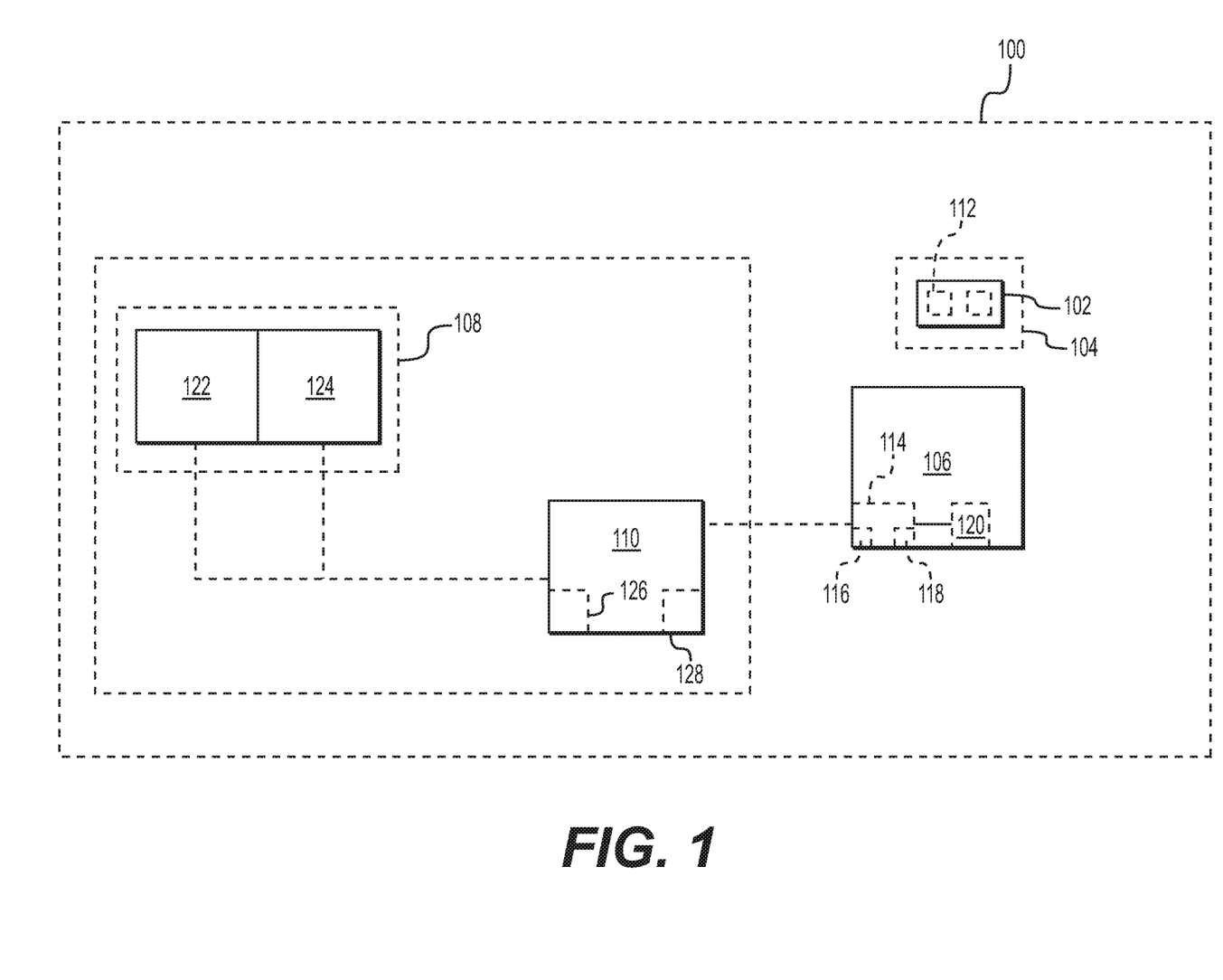
FIG. 1 is a functional block diagram illustrating a compressor manufacturing system for a multistage axial-centrifugal compressor for a gas turbine engine in accordance with the various teachings of the present disclosure.

FIG. 1 is a functional block diagram of a compressor manufacturing system 100 for manufacturing a multistage axial-centrifugal compressor 102 for a gas turbine engine 104 according to various embodiments. In one example, the compressor manufacturing system 100 includes a manufacturing system 106, a human-machine interface 108 and a controller 110. As will be discussed, the compressor manufacturing system 100 generates and machines airfoils 112 associated with the multistage axial-centrifugal compressor 102 to provide the desired airflow, pressure rise and efficiency for the multistage axial-centrifugal compressor 102 while also reducing manufacturing cost. As will be discussed with reference to FIGS. 4-6B, the plurality of airfoils 112 described herein are associated with a respective rotor disk, and in this example, the plurality of airfoils 112 are integrally formed with the respective rotor disk as a monolithic or single piece structure commonly referred to as an integral bladed disk or "blisk." In other embodiments, the airfoils 112 may be insert-type blades, which are received in mating slots provided around the outer periphery of rotor disk.

The manufacturing system 106 is any system or device that is capable of creating the airfoils 112 of the multistage axial-centrifugal compressor 102. In one example, the manufacturing system 106 machines the airfoils 112 based on one or more instructions received from the controller 110. The manufacturing system 106 includes any system capable of at least flank milling, hybrid milling or point milling to machine each of the airfoils 112. Generally, flank milling is an operation of the manufacturing system 106 to generate the respective airfoil 112 with a straight-line shape or geometry that has at least about 80% of the airfoil 112 defined by a series of straight-line shapes through the use of a cutting tool associated with the manufacturing system 106. Thus, a flank manufacturing approach is the manufacture of the respective airfoil 112 (the pressure and suction side surfaces) predominately or greater than 80% of the pressure and suction side surfaces, for example, from about 5% to about 95% span and 5% to about 90% chord, through a flank mill by the cutting tool associated with the manufacturing system 106. Hybrid milling is an operation of the manufacturing system 106 to generate the respective airfoil 112 with a combination of a complex, arbitrary shape and a straight-line shape or geometry that has at least about 80% of the airfoil 112 defined by a series of straight-line shapes through the use of a forming or cutting tool associated with the manufacturing system 106. Thus, a hybrid manufacturing approach is a combination of flank milling and point milling or the manufacture of the respective airfoil 112 (the pressure and suction side surfaces) between 20% and 80% of the pressure and suction side surfaces through flank milling and a remainder of the airfoil 112 is machined through point milling. Point milling is an operation of the manufacturing system 106 to generate the respective airfoil 112 with an arbitrary, complex line shape or geometry through the use of a cutting tool associated with the manufacturing system 106. Thus, an arbitrary manufacturing approach is the manufacture of the respective airfoil 112 (the pressure and suction side surfaces) predominately or greater than 80% of the pressure and suction side surfaces, for example, from about 5% to about 95% span and 5% to about 90% chord, through point milling by the cutting tool associated with the manufacturing system 106. It should be noted that in other embodiments, the arbitrary manufacturing approach may also include additive manufacturing, chemical milling or other technique that arrives at an unconstrained or complex shape for the respective airfoil 112 (the pressure and suction side surfaces). It should be noted that the compressor manufacturing system 100 machines both the pressure side surface and the opposite suction side surface associated with each of the airfoils 112 by the respective one of the flank milling (flank manufacturing approach), hybrid milling (hybrid manufacturing approach) and the point milling (arbitrary manufacturing approach) such that upon completion of the respective one of the flank milling, hybrid milling and the point milling the airfoil 112 is formed for use in the multistage axial-centrifugal compressor 102.

In one example, the manufacturing system 106 includes, but is not limited to, a computer numeric control (CNC) machine, a three dimensional metal printing machine, a direct metal laser sintering machine, an electro-chemical machining machine, a powder metallurgy machine, a composite ply lay-up machine or other manufacturing machines to list but a few examples. In one example, the manufacturing system 106 generally machines each of the airfoils 112 of a respective rotor disk out of a metal or metal alloy. In this example, the manufacturing system 106 includes a manufacturing controller 114, which is in communication with the controller 110 via a suitable communication architecture, such as a bus. The manufacturing controller 114 includes at least one manufacturing processor 116 and a manufacturing computer readable storage device or media 118. The manufacturing processor 116 can be any custom made or commercially available processor, a central processing unit (CPU), a graphics processing unit (GPU), an auxiliary processor among several processors associated with the manufacturing controller 114, a semiconductor based microprocessor (in the form of a microchip or chip set), a macroprocessor, any combination thereof, or generally any device for executing instructions. The manufacturing computer readable storage device or media 118 may include volatile and nonvolatile storage in read-only memory (ROM), random-access memory (RAM), and keep-alive memory (KAM), for example. KAM is a persistent or non-volatile memory that may be used to store various operating variables while the manufacturing processor 116 is powered down. The computer-readable storage device or media 118 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the manufacturing controller 114 in controlling components associated with the manufacturing system 106.

The instructions may include one or more separate programs, each of which comprises an ordered listing of executable instructions for implementing logical functions. The instructions, when executed by the manufacturing processor 116, receive and process input signals, perform logic, calculations, methods and/or algorithms for controlling the components of the manufacturing system 106, and generate control signals to the components of the manufacturing system 106, including, but not limited to, a forming or cutting tool associated with the manufacturing system 106 to form or machine the airfoils 112 based on the logic, calculations, methods, and/or algorithms. Although only one manufacturing controller 114 is shown in FIG. 1, embodiments of the manufacturing system 106 can include any number of manufacturing controllers 114 that communicate over any suitable communication medium or a combination of communication mediums and that cooperate to process signals, perform logic, calculations, methods, and/or algorithms, and generate control signals to control features, such as the cutting tool, of the manufacturing system 106. Generally, as will be discussed, the manufacturing controller 114 executes the instructions to flank mill one or more of the airfoils 112, executes the instructions to hybrid mill one or more of the airfoils 112 or executes the instructions to point mill one or more of the airfoils 112 based on data received from the controller 110.

The human-machine interface 108 is in communication with the controller 110 via a suitable communication medium, such as a bus. The human-machine interface 108 may be configured in a variety of ways. In some embodiments, the human-machine interface 108 may include various switches, one or more buttons, a touchscreen interface 122 that may be overlaid on a display 124, a keyboard, an audible device, a microphone associated with a speech recognition system, or various other human-machine interface devices. In one example, the touchscreen interface 122 may receive input from the user, such as an operational speed of the gas turbine engine 104 associated with the multistage axial-centrifugal compressor 102 and a temperature of air entering the multistage axial-centrifugal compressor 102, along with other desired attributes of the multi-stage axial centrifugal compressor 102 such as pressure ratio and flow capacity. The touchscreen interface 122 may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt of input from the user, the human-machine interface 108 transmits a signal to the controller 110. As will be discussed, the controller 110 processes the signal, and determines based on the input from the user and based on input received from other modules associated with the controller 110, the operational speed of the multi-stage axial centrifugal compressor 102, the number of axial stages of the multistage axial-centrifugal compressor 102, the leading tip edge radius of the axial compressor of each axial stage of the multistage axial-centrifugal compressor and the temperature at the inlet of each axial stage based on the user's interaction with the human-machine interface 108.

The display 124 comprises any suitable technology for displaying information, including, but not limited to, a liquid crystal display (LCD), organic light emitting diode (OLED), plasma, or a cathode ray tube (CRT). In this example, the display 124 is an electronic display capable of graphically displaying one or more user interfaces under the control of the controller 110. Those skilled in the art may realize other techniques to implement the display 124 in the compressor manufacturing system 100.

It should be noted that the human-machine interface 108 and the controller 110 may be associated with a personal computing device, including, but not limited to a desktop computer, laptop computer, tablet, portable electronic device, etc. Moreover, it should be noted that while the controller 110 and the human-machine interface 108 are described and illustrated herein as being discrete from the manufacturing system 106, the manufacturing system 106 may include the controller 110 such that in certain embodiments, the compressor manufacturing system 100 may include the manufacturing system 106 having the controller 110 and the manufacturing controller 114.

The controller 110 includes at least one processor 126 and a computer readable storage device or media 128. The processor 126 can be any custom made or commercially available processor, a central processing unit (CPU), a graphics processing unit (GPU), an auxiliary processor among several processors associated with the controller 110, a semiconductor based microprocessor (in the form of a microchip or chip set), a macroprocessor, any combination thereof, or generally any device for executing instructions. The computer readable storage device or media 128 may include volatile and nonvolatile storage in read-only memory (ROM), random-access memory (RAM), and keep-alive memory (KAM), for example. KAM is a persistent or non-volatile memory that may be used to store various operating variables while the processor 126 is powered down. The computer-readable storage device or media 128 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 110 in controlling components associated with the compressor manufacturing system 100.

The instructions may include one or more separate programs, each of which comprises an ordered listing of executable instructions for implementing logical functions. The instructions, when executed by the processor 126, receive and process input signals, perform logic, calculations, methods and/or algorithms for controlling the components of the compressor manufacturing system 100, and generate control signals to components of the compressor manufacturing system 100 to manufacture the airfoils 112 based on the logic, calculations, methods, and/or algorithms. Although only one controller 110 is shown in FIG. 1, embodiments of the compressor manufacturing system 100 can include any number of controllers 110 that communicate over any suitable communication medium or a combination of communication mediums and that cooperate to process signals, perform logic, calculations, methods, and/or algorithms, and generate control signals to control features of the compressor manufacturing system 100.

In various embodiments, one or more instructions of the controller 110 are associated with the compressor manufacturing system 100 and, when executed by the processor 126, the instructions receive and process signals from the human-machine interface 108 and determine the operational speed of the multi-stage axial centrifugal compressor 102, the number of axial stages of the multistage axial-centrifugal compressor 102, the leading edge tip radius of the axial compressor of each axial stage and the temperature at the inlet of each axial stage. In various embodiments, the instructions of the controller 110, when executed by the processor 126, determine whether to flank mill, hybrid mill or to point mill the airfoils 112 associated with each axial stage, and outputs manufacturing system data to the manufacturing controller 114 so that the manufacturing controller 114 controls the cutting tool of the manufacturing system 106 based on this determination. In various embodiments, the instructions of the controller 110, when executed by the processor 126, also determines whether to flank mill, hybrid mill or to point mill the airfoils 112 associated with each axial stage, and outputs a user interface for display on the display 124 based on this determination.

Figure 2:
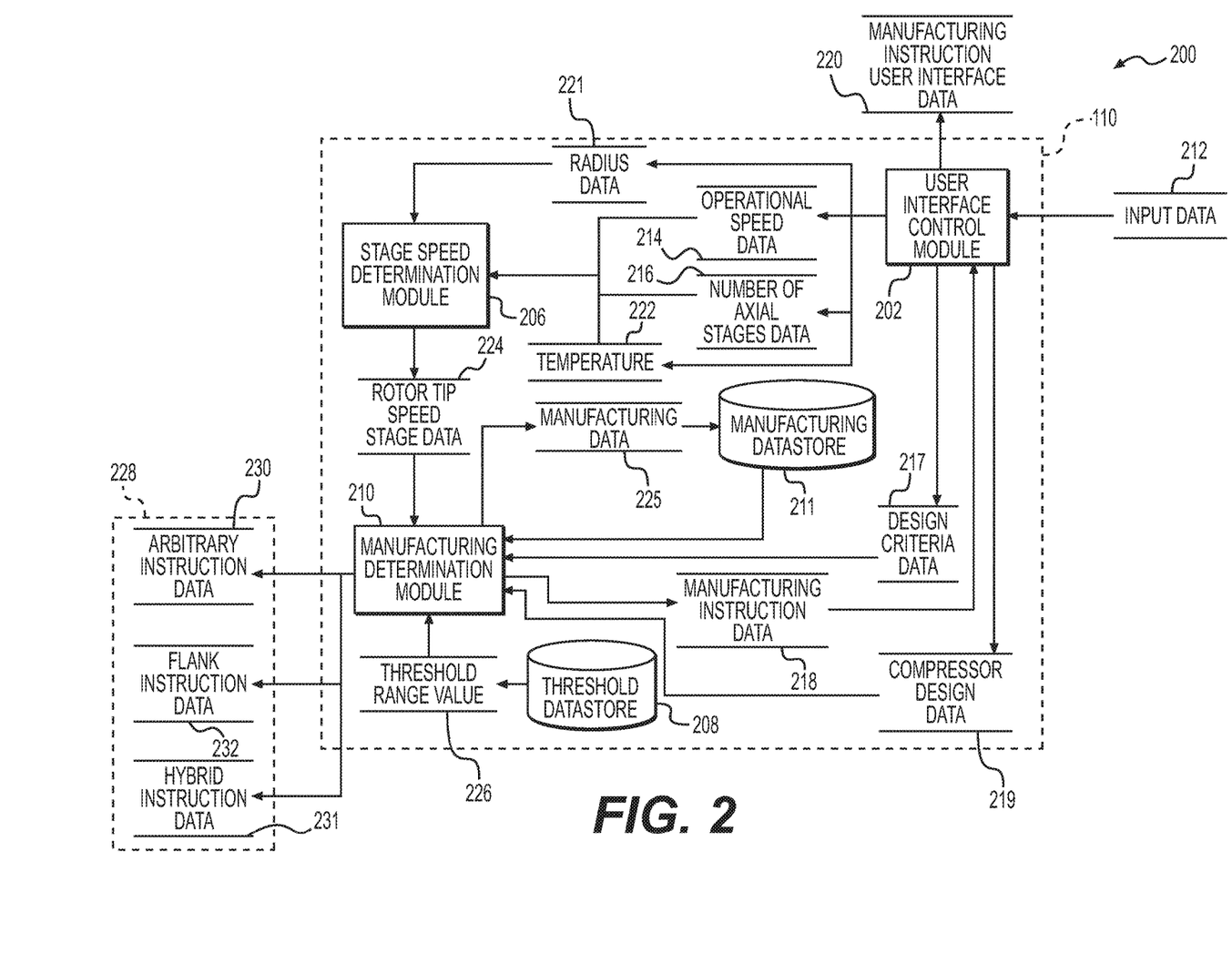
FIG. 2 is a dataflow diagram illustrating an airfoil manufacturing determination system of the compressor manufacturing system of FIG. 1, in accordance with various embodiments.

For example, as shown in more detail with regard to FIG. 2, and with continued reference to FIG. 1, a dataflow diagram illustrates various embodiments of an airfoil manufacturing determination system 200 of the compressor manufacturing system 100, which may be embedded within the controller 110. Various embodiments of the airfoil manufacturing determination system 200 according to the present disclosure can include any number of sub-modules embedded within the controller 110. As can be appreciated, the sub-modules shown in FIG. 2 may be combined and/or further partitioned to similarly receive data from the human-machine interface 108, and output data to one or more user interfaces. Inputs to the airfoil manufacturing determination system 200 may be received from the human-machine interface 108 (FIG. 1), received from other control modules (not shown) associated with the compressor manufacturing system 100, and/or determined/modeled by other sub-modules (not shown) within the controller 110. In various embodiments, with reference to FIG. 2, the airfoil manufacturing determination system 200 includes a user interface (UI) control module 202, a stage speed determination module 206, a threshold datastore 208, a manufacturing determination module 210 and a manufacturing datastore 211.

The UI control module 202 receives input data 212. The input data 212 is received from the human-machine interface 108 via the user's interaction with the human-machine interface 108, for example, the user's interaction with the touchscreen interface 122. The UI control module 202 processes the input data 212, and based on the input data 212, the UI control module 202 sets operational speed data 214, number of axial stages data 216, radius data 221 and temperature 222 for the stage speed determination module 206. The operational speed data 214 is an operational speed for the multi-stage axial centrifugal compressor 102 (FIG.

1). The operational speed for the multi-stage axial centrifugal compressor 102 or the operational speed data 214 is based on the operational speed of the gas turbine engine 104 during a majority of a mission or the operation of the gas turbine engine 104, such as during a cruise operation of the gas turbine engine 104 or a climb operation of the gas turbine engine 104, which is received as input to the human-machine interface 108. Generally, in the example of a two spool gas turbine engine 104, the multi-stage axial centrifugal compressor 102 operational speed is the same as the operational speed of the gas turbine engine 104. The number of axial stages data 216 is a number of axial stages of the multistage axial-centrifugal compressor 102, which is received as input to the human-machine interface 108. The radius data 221 is the leading edge tip radius of the axial compressor of each axial stage of the multistage axial-centrifugal compressor 102 in feet (ft), which is received as input to the human-machine interface 108 or received as input from another module associated with the airfoil manufacturing determination system 200. The temperature 222 is a temperature of the air entering the inlet of each axial stage of the multistage axial-centrifugal compressor 102, which is determined based on the temperature received as input to the human-machine interface 108 or is received as input from another module associated with the airfoil manufacturing determination system 200.

The UI control module 202 also processes the input data 212, and based on the input data 212, the UI control module 202 sets design criteria data 217 for the manufacturing determination module 210. The design criteria data 217 are pre-determined geometric shapes for the airfoils 112 that are entered as input by the user via the human-machine interface 108 or are received as input from another module associated with the airfoil manufacturing determination system 200. In one example, the design criteria data 217 includes, but is not limited to, a baseline geometry for each of the airfoils 112 for each axial stage, which is pre-determined based on operating criteria for the multistage axial-centrifugal compressor 102, including, but not limited to, a pressure ratio, flow capacity and operating speed for the multistage axial-centrifugal compressor 102.

The UI control module 202 also processes the input data 212, and based on the input data 212, the UI control module 202 sets compressor design data 219 for the manufacturing determination module 210. The compressor design data 219 is a pre-defined operating requirement that is entered as input by the user via the human-machine interface 108. In one example, the compressor design data 219 includes, but is not limited to, a value of a cost of the multistage axial-centrifugal compressor 102 and a value of a performance (for example, an efficiency or stall margin) of the multistage axial-centrifugal compressor 102. For example, in certain embodiments, the cost may have a greater value than the value of the performance as the operator may desire the cost of the multistage axial-centrifugal compressor 102 to be optimized. In other embodiments, the performance may have a greater value than the value of the cost, as the operator may desire peak performance for the multistage axial-centrifugal compressor 102. The value of the cost and the performance are generally relative values, which indicate the operator's preference for the cost of the multistage axial-centrifugal compressor 102 versus the performance.

The UI control module 202 also receives as input manufacturing instruction data 218 from the manufacturing determination module 210. The manufacturing instruction data 218 is data that indicates to flank mill, hybrid mill or to point mill the airfoils 112 associated with a particular stage of the multistage axial-centrifugal compressor 102 for each stage of the multistage axial-centrifugal compressor 102. Based on the manufacturing instruction data 218, the UI control module 202 generates and outputs manufacturing instruction user interface data 220 for rendering a user interface including the manufacturing instruction data 218 on the display 124. In one example, the manufacturing instruction user interface data 220 comprises data for rendering the user interface including the manufacturing instruction data 218 in a tabular format on the display 124.

Figure 5:
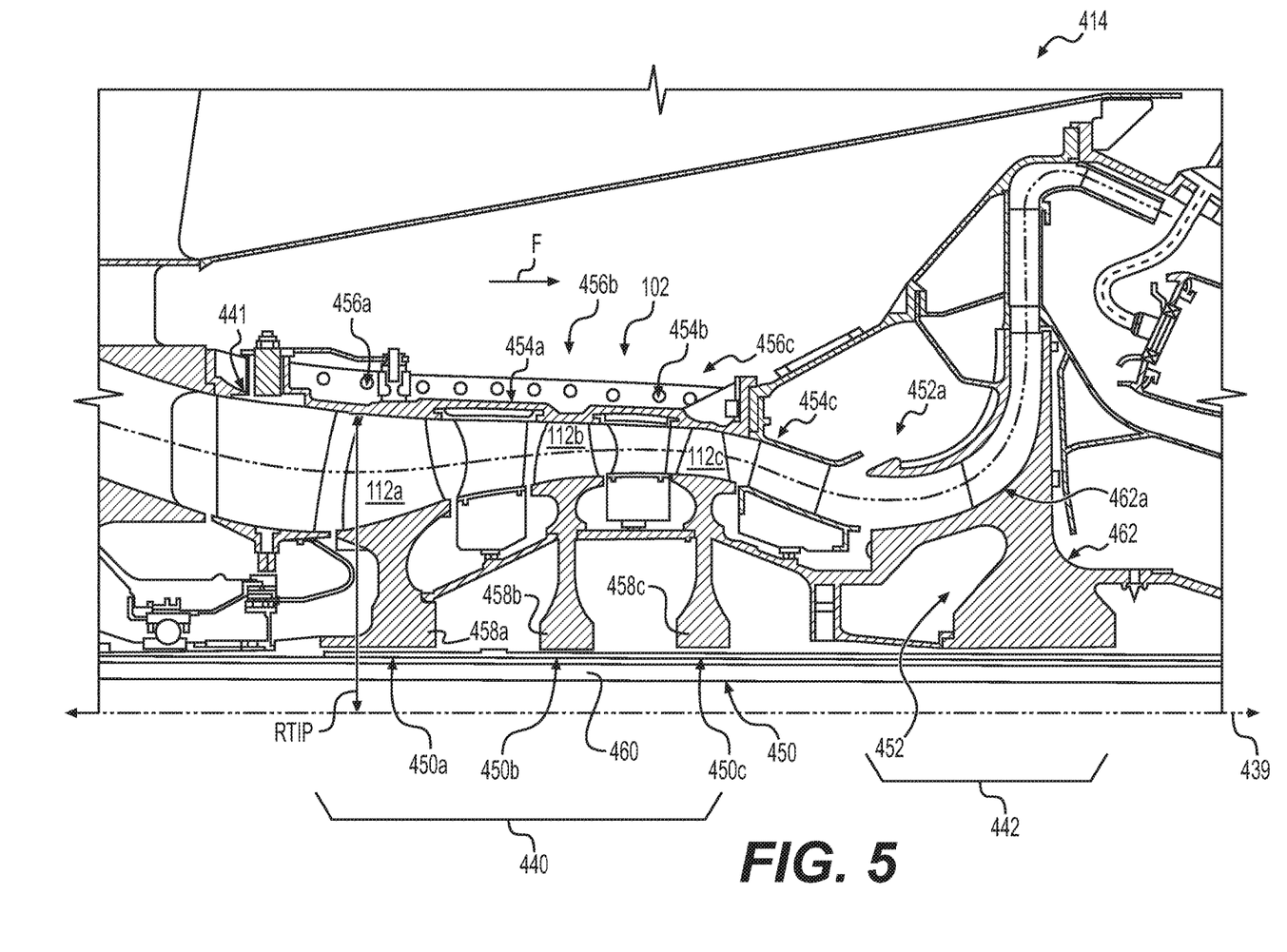
FIG. 5 is a detail cross-sectional view, taken at detail 5 of FIG. 4, which illustrates the multistage axial-centrifugal compressor according to various embodiments.

The stage speed determination module 206 receives as input the operational speed data 214, the number of axial stages data 216, the radius data 221 and the temperature 222 from the UI control module 202. Based on the operational speed data 214, the number of axial stages data 216, the radius data 221 and the temperature 222, the stage speed determination module 206 determines, for each axial stage (identified in the number of axial stages data 216), an operational rotor tip speed for the airfoils 112 for each axial stage of the multistage axial-centrifugal compressor 102. As used herein, the operational tip speed is a corrected tip speed, which is determined based on a speed of the rotor divided by a square root of the operating temperature of the rotor divided by a standard temperature. In one example, the stage speed determination module 206 determines the operational rotor tip speed for the airfoils 112 for each axial stage based on the following equation:

$$UtipC = \frac{(N * 2 * R_{tip} * \pi)}{\sqrt{\frac{T}{T_{ref}}}} \quad (1)$$

Wherein UtipC is the operational rotor tip speed (corrected tip speed) for the airfoils 112 for the particular axial stage in feet/second (ft/sec); N is the operational speed of the multistage axial-centrifugal compressor 102 in rotations per minute (rpm), which is determined based on the operational speed data 214; $R_{tip}$ is the leading edge tip radius of the axial compressor for the particular axial stage of the multistage axial-centrifugal compressor 102 in feet (ft), which is the radius data 221; T is the temperature 222 at the inlet for the particular axial stage in Rankine; and $T_{ref}$ is a reference temperature in Rankine, which is defined at sea-level on a standard day, and is a known or pre-defined value that is stored in a memory associated with the stage speed determination module 206. An example of $R_{tip}$, the leading edge tip radius for an exemplary axial compressor rotor 450a of a first axial stage 456a is shown in FIG. 5. It should be noted that in other embodiments, a leading edge tip diameter of the axial compressor for the particular axial stage of the multistage axial-centrifugal compressor 102 in feet (ft) may be received as input and used in place of $(2*R_{tip})$ in equation (1).

With reference back to FIG. 2, in this example, the gas turbine engine 104 is a single spool gas turbine engine, and N, the operational speed of the multistage axial-centrifugal compressor 102, is the same as the operational speed of the gas turbine engine 104 (FIG. 1) that is received as the operational speed data 214. It should be noted that, depending on the number of spools or rotational shafts associated with the gas turbine engine 104, there may be more than one operational speed associated with the gas turbine engine that is not equal to the operational speed data 214 for the multistage axial-centrifugal compressor. The stage speed determination module 206 sets the determined operational rotor tip speed for the airfoils 112 for each axial stage of the multistage axial-centrifugal compressor 102 as rotor tip speed stage data 224 for the manufacturing determination module 210. The rotor tip speed stage data 224 is the operational rotor tip speed for the airfoils 112 in a particular axial stage of the multistage axial-centrifugal compressor 102 for each axial stage of the multistage axial-centrifugal compressor 102, with the operational rotor tip speed comprising a corrected tip speed for each of the airfoils 112 of the particular axial stage.

The threshold datastore 208 stores data of thresholds for the operational rotor tip speed for the airfoils 112. In one example, the threshold datastore 208 stores threshold range value 226, which are known, predefined or factory-set values for a threshold range of operational rotor tip speed for the airfoils 112. In this example, the threshold range value 226 is about 1250 feet per second (ft/s) to about 1400 feet per second (ft/s). It should be noted that in other embodiments, the threshold datastore 208 may store a single value, under which the flank manufacturing approach is determined and over which the arbitrary manufacturing approach is determined.

The manufacturing datastore 211 stores data of the manufacturing approach for a particular stage of the multistage axial-centrifugal compressor 102. In one example, the manufacturing datastore 211 stores manufacturing data 225, which is populated by the manufacturing determination module 210. Generally, the manufacturing datastore 211 stores, for each axial stage, whether to manufacture the airfoils 112 by the flank manufacturing approach, the hybrid manufacturing approach or the arbitrary manufacturing approach, as determined by the manufacturing determination module 210. In one example, the manufacturing datastore 211 may store a data table, which is populated by the manufacturing determination module 210.

The manufacturing determination module 210 receives as input the rotor tip speed stage data 224 and the compressor design data 219. The manufacturing determination module 210 queries the threshold datastore 208 and retrieves the threshold range value 226. For each axial stage of the multistage axial-centrifugal compressor 102, the manufacturing determination module 210 compares the operational rotor tip speed for the airfoils 112 of each axial stage in the rotor tip speed stage data 224 to the threshold range value 226 for the operational rotor tip speed for the airfoils 112. Based on this comparison, the manufacturing determination module 210 determines whether the particular axial stage of the multistage axial-centrifugal compressor 102 is to be manufactured according to the flank manufacturing approach (resulting in flank milled airfoils 112 with a straight-line shape), the hybrid manufacturing approach (resulting airfoils 112 that have both an arbitrary shape and a straight-line shape) or the arbitrary manufacturing approach (resulting in point milled airfoils 112 with an arbitrary shape). The manufacturing determination module 210 associates the determination (flank manufacturing approach, hybrid manufacturing approach or arbitrary manufacturing approach) with the particular axial stage of the multistage axial-centrifugal compressor 102 and stores this as manufacturing data 225 in the manufacturing datastore 211.

Generally, in this example, the manufacturing determination module 210 determines that the airfoils 112 of a particular axial stage are manufactured or machined according to the arbitrary manufacturing approach based on the determination that the operational rotor tip speed for the airfoils 112 for the particular axial stage is greater than or above the threshold range value 226. For example, manufacturing determination module 210 determines that the airfoils 112 of a particular axial stage are manufactured or machined according to the arbitrary manufacturing approach based on the airfoils 112 having an operational rotor tip speed greater than about 1400 feet per second (ft/s). The manufacturing determination module 210 determines that the airfoils 112 of a particular axial stage are manufactured or machined according to the flank manufacturing approach based on the determination that the operational rotor tip speed for the airfoils 112 for the particular axial stage is less than the threshold range value 226. For example, manufacturing determination module 210 determines that the airfoils 112 of a particular axial stage are manufactured or machined according to the flank manufacturing approach based on the airfoils 112 having an operational rotor tip speed less than about 1250 feet per second (ft/s).

For a particular axial stage that has the airfoils 112 with the operational rotor tip speed of the airfoils 112 within the threshold range value 226, the manufacturing determination module 210 determines the manufacturing approach based on the compressor design data 219. For example, based on the airfoils 112 having an operational rotor tip speed that is greater than about 1250 feet per second (ft/s) and is less than about 1400 feet per second (ft/s), the manufacturing determination module 210 determines whether the value of the cost is greater than the value of the performance. If the value of the cost is greater than the value of the performance, the manufacturing determination module 210 determines that the airfoils 112 of that particular axial stage are manufactured or machined according to the flank manufacturing approach. If the value of the cost is less than the value of the performance based on the compressor design data 219, the manufacturing determination module 210 determines that the airfoils 112 of that particular axial stage are manufactured or machined according to the arbitrary manufacturing approach. If the value of the cost is equal to the value of the performance based on the compressor design data 219, the manufacturing determination module 210 determines that the airfoils 112 of that particular axial stage are manufactured or machined according to the hybrid manufacturing approach. In certain instances, the manufacturing determination module 210 may also set a prompt for the UI control module 202 to output a prompt user interface, for example, to request user input for the desired manufacturing approach based on the airfoils 112 for a particular axial stage having the operational rotor tip speed within the threshold range value 226.

Thus, the manufacturing determination module 210 determines, for each axial stage of the multistage axial-centrifugal compressor 102, whether to manufacture or machine the airfoils 112 associated with the particular axial stage according to the arbitrary manufacturing approach, the hybrid manufacturing approach or the flank manufacturing approach based on a comparison of the operational rotor tip speed for the airfoils 112 in that axial stage to the threshold range value 226 and based on the compressor design data 219, associates this determination with the particular axial stage, and stores this as the manufacturing data 225 in the manufacturing datastore 211.

The manufacturing determination module 210 also determines whether each of the axial stages of the multistage axial-centrifugal compressor 102 has a manufacturing approach determination associated with it by a counter, for example. If true, the manufacturing determination module 210 retrieves the manufacturing data 225 from the manufacturing datastore 211. The manufacturing determination module 210 sets the manufacturing data 225 retrieved from the manufacturing datastore 211 as manufacturing instruction data 218 for the UI control module 202.

Based on the determination that each of the axial stages of the multistage axial-centrifugal compressor 102 has a manufacturing approach determination associated with it, the manufacturing determination module 210 also retrieves the manufacturing data 225 from the manufacturing datastore 211. Based on the retrieved manufacturing data 225, the manufacturing determination module 210 receives the design criteria data 217 as input. For the manufacturing approach defined in the manufacturing data 225 for each axial stage, the manufacturing determination module 210 evaluates the geometric shape for the respective airfoil 112 to determine whether the geometric shape may be machined according to the manufacturing approach retrieved for the particular axial stage from the manufacturing data 225. If the geometric shape of the airfoil 112 is unable to be manufactured according to the determined approach, the manufacturing determination module 210 constrains the geometric shape to enable the manufacturing of the airfoil 112 according to the determined manufacturing approach. Once the manufacturing determination module 210 has determined that each airfoil 112 is capable of being manufactured according to the determined manufacturing approach, the manufacturing determination module 210 generates and outputs manufacturing system data 228. In one example, the manufacturing system data 228 includes arbitrary instruction data 230, hybrid instruction data 231 and flank instruction data 232. The arbitrary instruction data 230 is one or more control signals for the manufacturing controller 114 of the manufacturing system 106 to control the cutting tool to form or machine the airfoils 112 associated with a particular axial stage of the multistage axial-centrifugal compressor 102 to have an arbitrary shape according to the arbitrary manufacturing approach. The hybrid instruction data 231 is one or more control signals for the manufacturing controller 114 of the manufacturing system 106 to control the cutting tool to form or machine the airfoils 112 associated with a particular axial stage of the multistage axial-centrifugal compressor 102 to have a combination of an arbitrary shape and a straight-line shape according to the hybrid manufacturing approach. The flank instruction data 232 is one or more control signals for the manufacturing controller 114 of the manufacturing system 106 to control the cutting tool to form or machine the airfoils 112 associated with a particular axial stage of the multistage axial-centrifugal compressor 102 to have a straight-line shape according to the flank manufacturing approach.

Generally, in this example, the manufacturing determination module 210 generates and outputs the arbitrary instruction data 230 based on the determination of the arbitrary manufacturing approach for the particular axial stage (i.e. the determination that the operational rotor tip speed for the airfoils 112 for a particular stage is greater than or above the threshold range value 226; or the determination that the operational rotor tip speed for the airfoils 112 for a particular stage is within the threshold range value 226 and the value of the performance is greater than the value of the cost). The manufacturing determination module 210 generates and outputs the hybrid instruction data 231 based on the determination of the hybrid manufacturing approach for the particular axial stage (i.e. the determination that the operational rotor tip speed for the airfoils 112 for a particular stage is within the threshold range value 226 and the value of the performance is equal to the value of the cost). The manufacturing determination module 210 generates and outputs the flank instruction data 232 based on the determination of the flank manufacturing approach for the particular axial stage (i.e. that the operational rotor tip speed for the airfoils 112 for a particular stage is less than or below the threshold range value 226; or the determination that the operational rotor tip speed for the airfoils 112 for a particular stage is within the threshold range value 226 and the value of the performance is less than the value of the cost).

Thus, the manufacturing determination module 210 determines, for each axial stage of the multistage axial-centrifugal compressor 102, whether to manufacture the airfoils 112 associated with the particular axial stage according to the arbitrary manufacturing approach, the hybrid manufacturing approach or the flank manufacturing approach based on a comparison of the operational rotor tip speed for the airfoils 112 in that axial stage to the threshold range value 226 and based on the compressor design data 219; and outputs one or more control signals to the manufacturing system 106 based on these determinations. Based on the one or more control signals received from the controller 110, the manufacturing controller 114 controls the forming or cutting tool associated with the manufacturing system 106 to machine the airfoils 112 of each axial stage based on the respective one of the arbitrary manufacturing approach, the hybrid manufacturing approach or the flank manufacturing approach.

Figure 3:
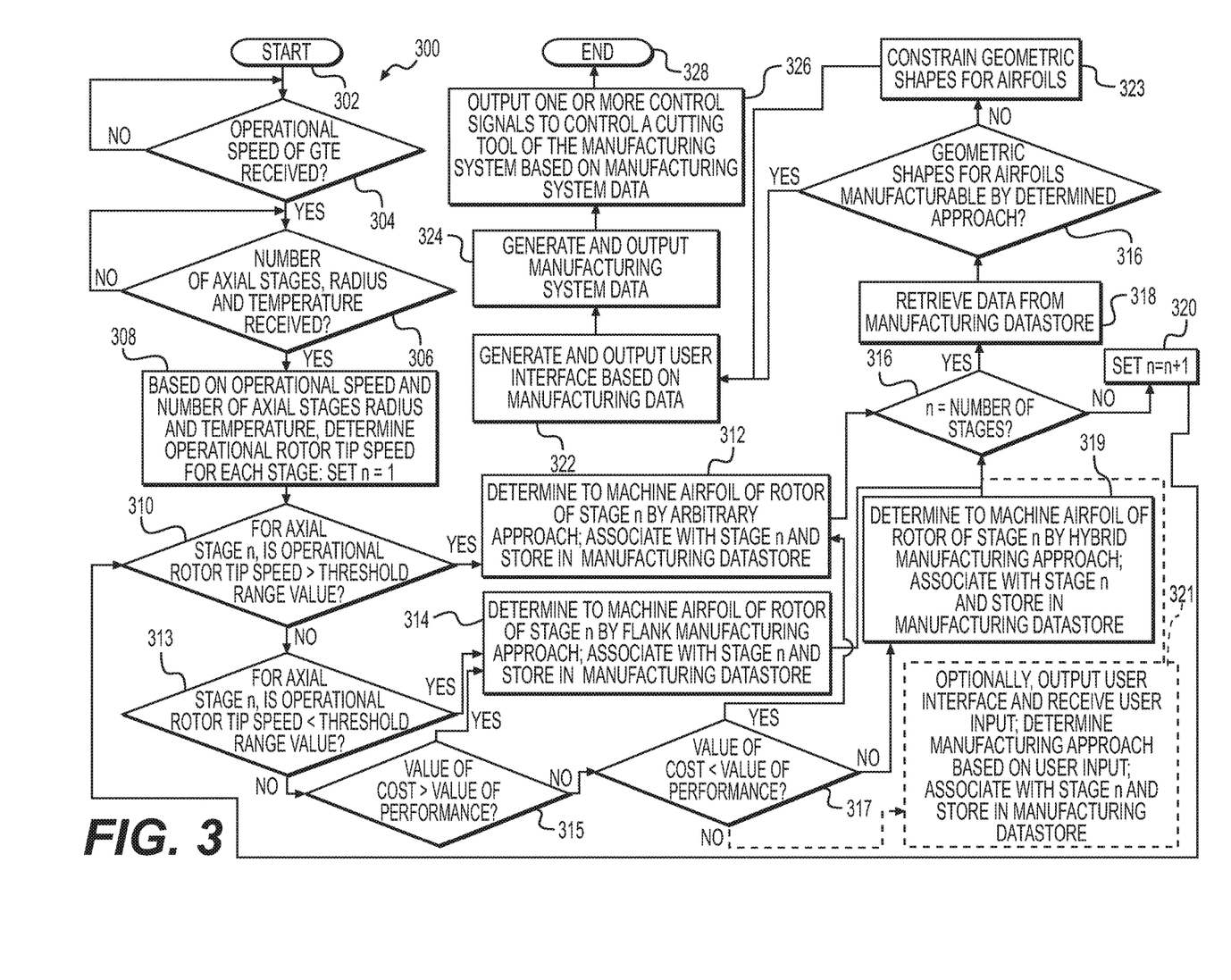
FIG. 3 is a flowchart illustrating a control method for the airfoil manufacturing determination system of the compressor manufacturing system of FIG. 1, in accordance with various embodiments.

Referring now to FIG. 3, and with continued reference to FIGS. 1 and 2, a flowchart illustrates a control method 300 that can be performed by the airfoil manufacturing determination system 200 of FIG. 2 of the compressor manufacturing system 100 in accordance with the present disclosure. In various embodiments, the control method 300 is performed by the processor 126 of the controller 110. As can be appreciated in light of the disclosure, the order of operation within the method is not limited to the sequential execution as illustrated in FIG. 3, but may be performed in one or more varying orders as applicable and in accordance with the present disclosure. In various embodiments, the control method 300 can be scheduled to run based on one or more predetermined events, such as based on the receipt of the input data 212.

The method begins at 302. At 304, the method determines whether the operational speed of the gas turbine engine 104 has been received from the user's interaction with the human-machine interface 108. If true, the method determines the operational speed of the multi-stage axial centrifugal compressor 102 based on the operational speed of the gas turbine engine 104 and proceeds to 306. Otherwise, the method loops.

At 306, the method determines whether the number of axial stages of the multistage axial-centrifugal compressor 102 (i.e. the number of axial stages data 216), the radius data 221 and the temperature 222 have been received based on input received to the human-machine interface 108 or input received from other modules associated with the airfoil manufacturing determination system 200 (FIG. 2). If true, the method proceeds to 308. Otherwise, the method loops.

At 308, based on the operational speed of the multi-stage axial centrifugal compressor 102, the number of axial stages of the multistage axial-centrifugal compressor 102, the leading edge tip radius of the axial compressor of each axial stage (the radius data 221) and the temperature at the inlet at each axial stage (temperature 222), the method determines the operational rotor tip speed of the airfoils 112 for each axial stage of the multistage axial-centrifugal compressor 102 based on equation (1), and sets a counter n equal to 1. At 310, the method queries the threshold datastore 208 and retrieves the threshold range value 226. The method determines, for axial stage n, whether the operational rotor tip speed value for the particular axial stage is greater than the threshold range value 226. In this example, the method determines whether the operational rotor tip speed for axial stage n is greater than about 1400 feet per second (ft/s). If true, at 312, the method determines to machine the airfoils 112 of the particular axial stage by the arbitrary manufacturing approach. The method associates this determination of the arbitrary manufacturing approach with the particular axial stage, and stores the associated data as the manufacturing data 225 in the manufacturing datastore 211.

At 313, the method determines, for axial stage n, whether the operational rotor tip speed value for the particular axial stage is less than the threshold range value 226. In this example, the method determines whether the operational rotor tip speed for axial stage n is less than about 1250 feet per second (ft/s). If true, at 314, the method determines to machine the airfoils 112 of the particular axial stage by the flank manufacturing approach. The method associates this determination of the flank manufacturing approach with the particular axial stage, and stores the associated data as the manufacturing data 225 in the manufacturing datastore 211.

At 313, if the method determines that the operational rotor tip speed value for the particular axial stage is not less than the threshold range value 226, at 315, the method determines that the operational rotor tip speed for axial stage n is greater than about 1250 feet per second (ft/s), but less than about 1400 feet per second (ft/s). The method receives as input the compressor design data 219. Based on the compressor design data 219, the method determines whether the value of the cost is greater than the value of the performance of the multistage axial-centrifugal compressor 102. If true, the method proceeds to 314. Otherwise, at 317, the method determines whether the value of the cost is less than the value of the performance of the multistage axial-centrifugal compressor 102 based on the compressor design data 219. If true, the method proceeds to 312. Otherwise, at 319, the method determines to machine the airfoils 112 of the particular axial stage by the hybrid manufacturing approach. The method associates this determination of the hybrid manufacturing approach with the particular axial stage, and stores the associated data as the manufacturing data 225 in the manufacturing datastore 211. Optionally, at 321, the method may also generate and output a prompt user interface to request user input for the desired manufacturing approach based on the airfoils 112 for a particular axial stage having the operational rotor tip speed within the threshold range value 226 and the value of the cost equal to the value of the performance. Based on the user input received, the method determines the manufacturing approach, associates this manufacturing approach with the particular stage and saves this association in the manufacturing datastore 211.

At 316, the method determines if the counter n is equal to the number of axial stages of the multistage axial-centrifugal compressor 102 by comparing the counter n to the number of axial stages data 216. If true, the method proceeds to 318. Otherwise at 320, the method sets the counter n to n+1 and loops to 310.

At 318, the method retrieves the manufacturing data 225 from the manufacturing datastore 211. At 319, the method determines, based on the retrieved manufacturing data 225 and the design criteria data 217 for each axial stage, whether the geometric shape for the respective airfoil 112 may be machined according to the manufacturing approach retrieved for the particular axial stage from the manufacturing data 225. If true, the method proceeds to 322. Otherwise, if the method determines the geometric shape of the airfoil 112 is unable to be manufactured according to the determined manufacturing approach, at 323, the method constrains the geometric shape to enable the manufacturing of the airfoil 112 according to the determined manufacturing approach.

At 322, the method generates and outputs the manufacturing instruction user interface data 220 based on the retrieved manufacturing data 225. At 326, the method generates and outputs the manufacturing system data 228 (including the arbitrary instruction data 230, the hybrid instruction data 231 and the flank instruction data 232) based on the retrieved manufacturing data 225 for the manufacturing controller 114 of the manufacturing system 106. At 326, the method, via the manufacturing controller 114 of the manufacturing system 106, controls the manufacturing system 106, via control of a cutting tool associated with the manufacturing system 106, for example, to manufacture the airfoils 112 based on the manufacturing system data 228. In one example, the manufacturing controller 114, based on the manufacturing system data 228 generates and outputs one or more control signals for controlling the manufacturing system 106 to manufacture the airfoils 112 according to the determined manufacturing approach. The method ends at 328.

Figure 4:
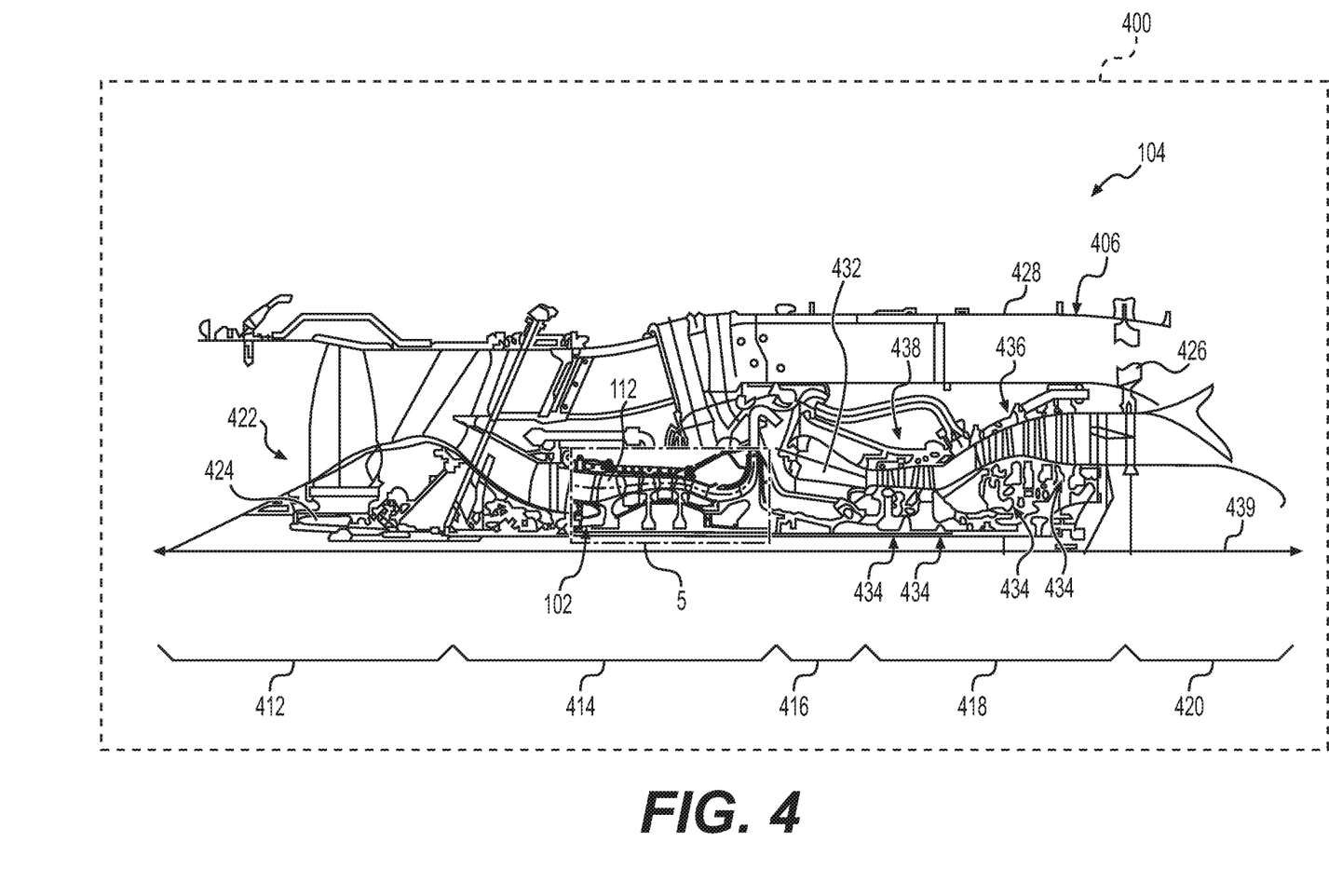
FIG. 4 is a schematic cross-sectional illustration of the gas turbine engine, which includes the multistage axial-centrifugal compressor manufactured by the airfoil manufacturing determination system of FIGS. 2 and 3 in accordance with the various teachings of the present disclosure.

With reference to FIG. 4, a partial, cross-sectional view of the gas turbine engine 104 is shown with the remaining portion of the gas turbine engine 104 being substantially axisymmetric about a longitudinal axis 439, which also comprises an axis of rotation for the gas turbine engine 104. In the depicted embodiment, the gas turbine engine 104 is an annular multi-spool turbofan gas turbine jet engine within an aircraft 400, although other arrangements and uses may be provided. As discussed, the gas turbine engine 104 includes multistage axial-centrifugal compressor 102, which includes the airfoils 112 manufactured by the airfoil manufacturing determination system 200 of FIGS. 1-3. The airfoil manufacturing determination system 200 ensures that the axial stages of the multistage axial-centrifugal compressor 102 are manufactured by the manufacturing system 106 (FIG. 1) by the manufacturing method that optimizes cost and provides for a desired amount of efficiency for the respective axial stages based on the operational rotor tip speed of the airfoils 112 of the respective stage.

In this example, with continued reference to FIG. 4, the gas turbine engine 104 includes a fan section 412, the compressor section 414, a combustor section 416, a turbine section 418, and an exhaust section 420. In one example, the fan section 412 includes a fan 422 mounted on a rotor 424 that draws air into the gas turbine engine 104 and compresses it. A fraction of the fan compressed air exhausted from the fan 422 is directed through an outer bypass duct 406 and the remaining fraction of air exhausted from the fan 422 is directed into the compressor section 414. The outer bypass duct 406 is generally defined by an outer casing 428 that is spaced apart from and surrounds the exhaust guide vane 426.

The compressor section 414 includes the multistage axial-centrifugal compressor 102. The multistage axial-centrifugal compressor 102 sequentially raises the pressure of the air and directs a majority of the high pressure air into the combustor section 416. A fraction of the compressed air bypasses the combustor section 416 and is used to cool, among other components, turbine blades in the turbine section 418.

In the embodiment of FIG. 4, in the combustor section 416, which includes a combustion chamber 432, the high pressure air is mixed with fuel, which is combusted. The high-temperature combustion air or combustive gas flow is directed into the turbine section 418. In this example, the turbine section 418 includes one or more turbines 434 disposed in axial flow series. It will be appreciated that the number of turbines, and/or the configurations thereof, may vary. The combustive gas expands through and rotates the turbines 434. The combustive gas flow then exits turbine section 418 for mixture with the cooler bypass airflow from the outer bypass duct 406 and is ultimately discharged from gas turbine engine 104 through exhaust section 420. As the turbines 434 rotate, each drives equipment in the gas turbine engine 104 via concentrically disposed shafts or spools. Generally, the turbines 434 in the turbine section 418, the multistage axial-centrifugal compressor 102 in the compressor section 414 and the fan 422 are mechanically linked by one or more shafts or spools. In this example, the gas turbine engine has two spools. The turbines 434 contained within a high pressure (HP) turbine 438 are rotationally fixed to the multistage axial-centrifugal compressor 102 contained within compressor section 414 by a HP shaft, while the turbines 434 contained within a low pressure (LP) turbine 436 are rotationally fixed to the rotor 424 of the fan 422 by a coaxial LP shaft. In other embodiments, gas turbine engine 104 may be a multi-spool engine containing more than two coaxial shafts or may contain one or more transfer gearboxes connecting the shafts between the turbine sections and the fan and compressor sections.

With reference to FIG. 5, a cross-sectional detail view of a portion of the compressor section 414 is shown. The compressor section 414 includes the multistage axial-centrifugal compressor 102. The multistage axial-centrifugal compressor 102 includes at least one or a plurality of axial compressor rotors 450 in an axial compressor section 440 and a centrifugal compressor 452 in a centrifugal compressor section 442, which is downstream from the axial compressor rotors 450 of the axial compressor section 440. In one example, the multistage axial-centrifugal compressor 102 also includes an inlet guide vane 441. The inlet guide vane 441 directs the fan compressed air from the fan section 412 (FIG. 4) into the axial compressor rotors 450. In this example, the multistage axial-centrifugal compressor 102 includes three axial compressor rotors 450a-450c and a single centrifugal compressor 452; however, it should be understood that the number of axial compressor rotors and centrifugal compressors in the multistage axial-centrifugal compressor 102 and the configuration thereof may vary. Each of the axial compressor rotors 450a-450c cooperates with a respective stator 454a-454c to define an axial stage 456 of the multistage axial-centrifugal compressor 102; and the centrifugal compressor 452 includes an impeller assembly 462. The impeller assembly 462 includes at least one airfoil 462a having a straight-line shape such that the impeller assembly 462 may be formed by flank milling.

Thus, in this example, the multistage axial-centrifugal compressor 102 includes three axial stages 456: a first axial stage 456a (the inlet guide vane 441, the axial compressor rotor 450a and the stator 454a); a second axial stage 456b (the axial compressor rotor 450b and the stator 454b); and a third axial stage 456c (the axial compressor rotor 450c and the stator 454c). The multistage axial-centrifugal compressor 102 includes the centrifugal stage 452a (the impeller assembly 462). The first axial stage 456a is upstream (in the direction of airflow F through the multistage axial-centrifugal compressor 102) from each of the second axial stage 456b and the third axial stage 456c. Each axial compressor rotor 450a-450c of the multistage axial-centrifugal compressor 102 includes the plurality of airfoils, and in the example of three axial compressor rotors 450a-450c, each of the axial compressor rotors 450a-450c includes a respective plurality of the airfoils 112a-112c. Each of the plurality of airfoils 112a-112c is coupled to a respective rotor disk 458a-458c. As discussed, in this example, the plurality of airfoils 112a-112c are integrally formed with the respective rotor disk 458a-458c as a monolithic or single piece structure or an integral bladed disk or "blisk." The rotor disks 458a-458c are each coupled to or mounted on a single, common shaft 460. The axial compressor rotor 450a-450c of each axial stage 456a-456c has $R_{tip}$, which is the leading edge tip radius of the rotor for the respective axial compressor rotor 450a-450c (with the rotor defined by the respective airfoils 112a-112c and the respective rotor disk 458a-458c), and $R_{tip}$ is shown for the axial compressor rotor 450a of the first axial stage 456a in FIG. 5.

The axial compressor section 440 leads into the centrifugal compressor section 442 such that an exit of the axial compressor section 440 is in fluid communication with an inlet of the centrifugal compressor 452. The centrifugal compressor 452 compresses the fluid and directs the flow radially outward (i.e., in a direction which increases in a radial direction away from the longitudinal axis 439) through the impeller assembly 462 that is coupled, connected to and driven on the single, common shaft 460. The rotor disk 458a-458c and the impeller assembly 462 shown in FIG. 5 are coupled or connected to a common drive shaft (the shaft 460) for co-rotation.

In this example, the operational rotor tip speed of the plurality of airfoils 112a of the rotor disk 458a is greater than 1400 ft/s, and thus, the plurality of airfoils 112a are determined by the airfoil manufacturing determination system 200 of FIGS. 1-3 to be manufactured according to the arbitrary manufacturing approach. Thus, the cutting tool of the manufacturing system 106 (FIG. 1) is controlled by the controller 110 to manufacture or machine the plurality of airfoils 112a of the rotor disk 458a such that each of the plurality of airfoils 112a has an arbitrary shape or complex, unconstrained geometry that requires point milling to manufacture the respective airfoil 112a. The operational rotor tip speed of the plurality of airfoils 112b of the rotor disk 458b is also greater than 1400 ft/s, and thus, the plurality of airfoils 112b are determined by the airfoil manufacturing determination system 200 of FIGS. 1-3 to be manufactured according to the arbitrary manufacturing approach. The cutting tool of the manufacturing system 106 (FIG. 1) is controlled by the controller 110 to manufacture or machine the plurality of airfoils 112b of the rotor disk 458b such that each of the plurality of airfoils 112b has an arbitrary shape or complex, unconstrained geometry that requires point milling.

The operational rotor tip speed of the plurality of airfoils 112c of the rotor disk 458c is less than 1250 ft/s, and thus, the plurality of airfoils 112c are determined by the airfoil manufacturing determination system 200 of FIGS. 1-3 to be manufactured according to the flank manufacturing approach. Thus, the cutting tool of the manufacturing system 106 (FIG. 1) is controlled by the controller 110 to manufacture the plurality of airfoils 112c of the rotor disk 458c such that each of the plurality of airfoils 112c has a straight-line shape or simple, constrained geometry that requires flank milling to manufacture or machine the respective airfoil 112c.

Figure 6A:
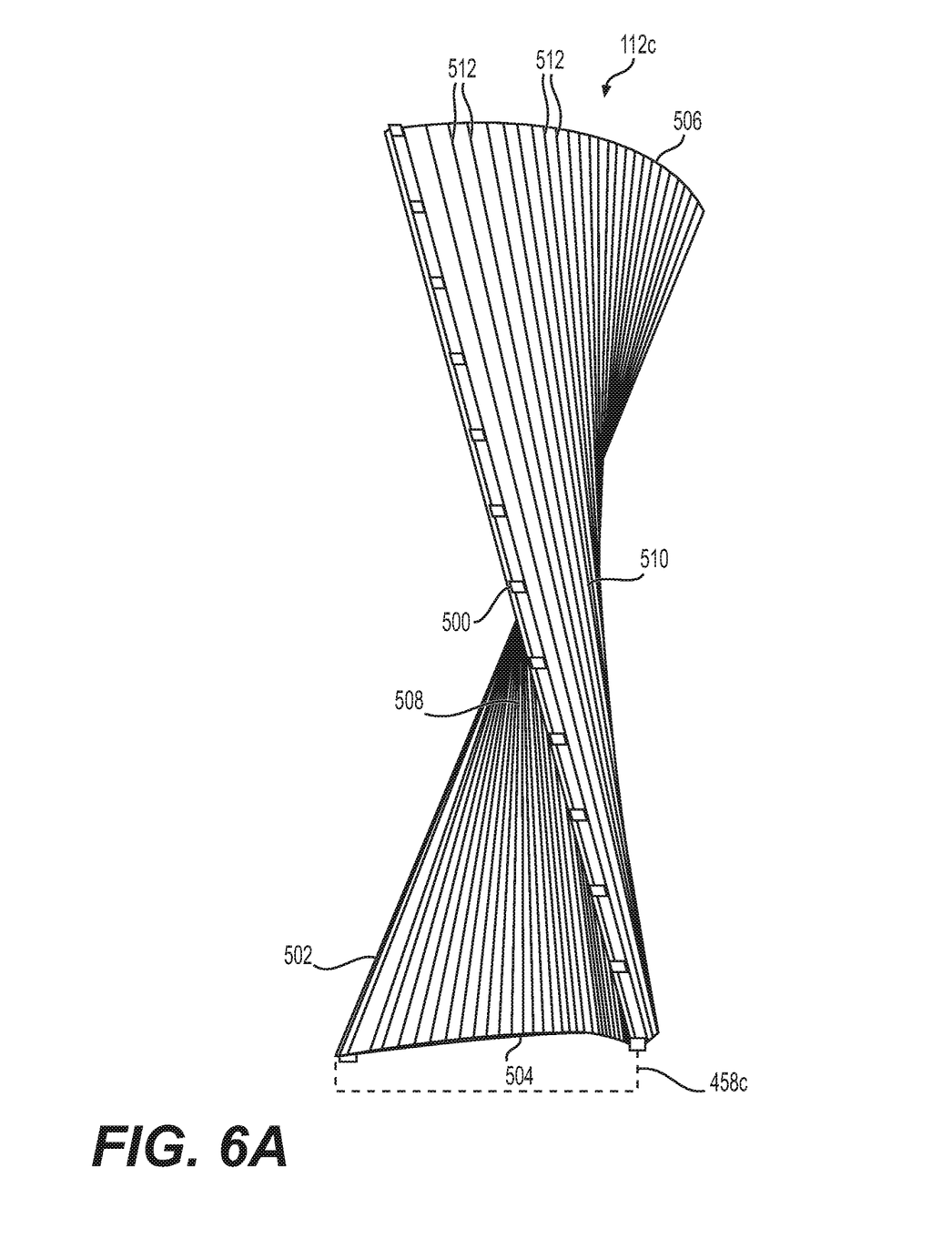
FIG. 6A is a schematic view of a leading edge of an airfoil for manufacturing according to a flank manufacturing approach.
Figure 6B:
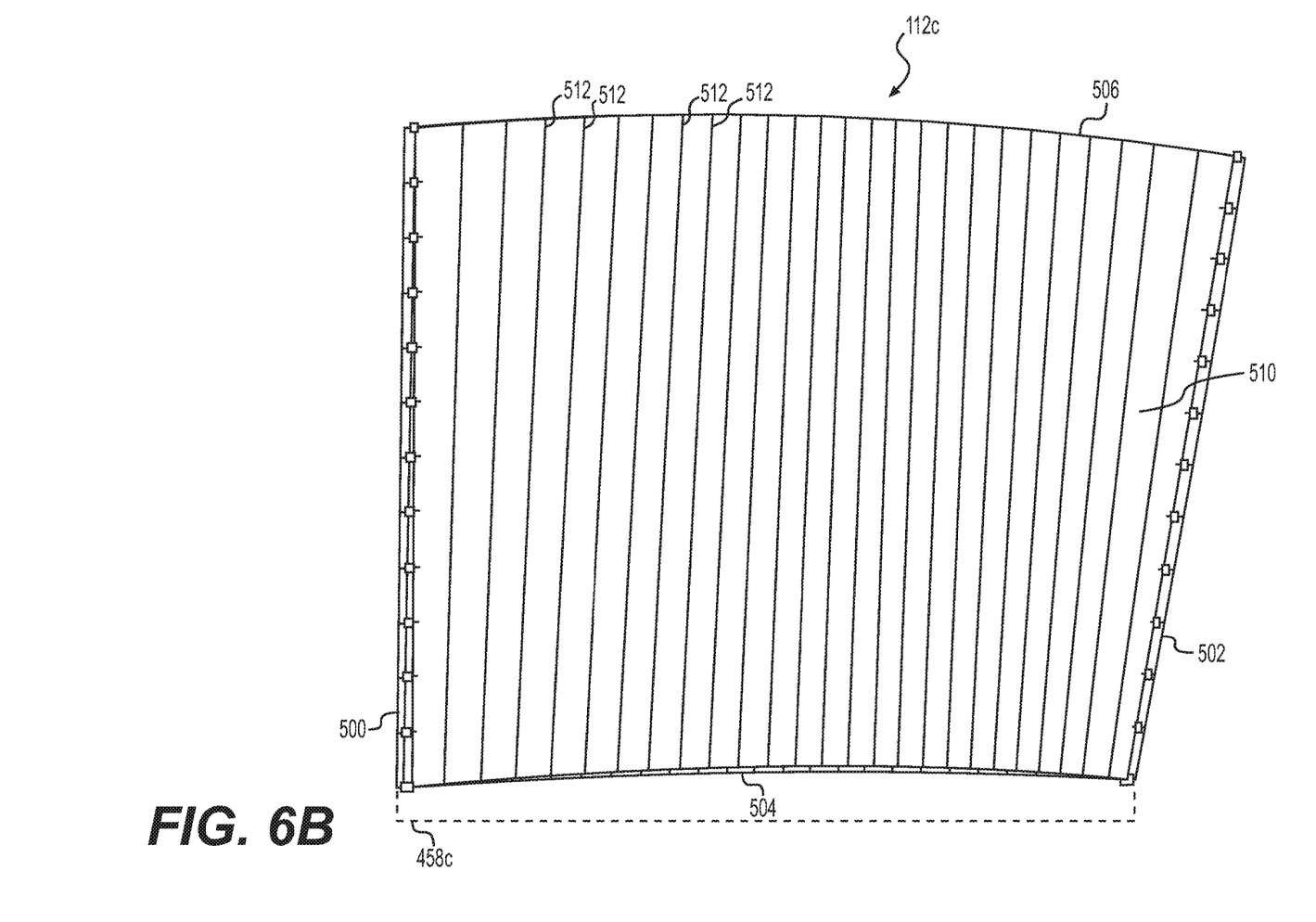
FIG. 6B is a side view of a suction side of the airfoil of FIG. 6A.

For example, with reference to FIGS. 6A and 6B, one of the airfoils 112c is shown. The airfoil 112c extends in a radial direction (relative to the longitudinal axis 439 of the gas turbine engine 104 in FIG. 4) about the periphery of the rotor disk 458c. The airfoil 112c each includes a leading edge 500, an axially-opposed trailing edge 502, a base or root 504, and a radially-opposed tip 506. The airfoil 112c further includes a first principal face or a "pressure side" 508 and a second, opposing face or a "suction side" 510. As shown in each of FIGS. 6A and 6B, the airfoil 112c is defined by a plurality of straight-lines 512, which extend from the root 504 to the tip 506. By defining the airfoil 112c by the plurality of straight-lines 512, the cutting tool of the manufacturing system 106 (FIG. 1) may be controlled to flank mill to manufacture or machine the airfoil 112c. It should be understood, based on FIGS. 6A and 6B, the airfoils 112a, 112b (FIG. 5) having the arbitrary shape or complex, unconstrained geometry do not include the plurality of straight-lines 512 as shown in FIGS. 6A and 6B, but rather, the airfoils 112a, 112b are defined by a plurality of complex or unconstrained geometric features.

Thus, in the example of the gas turbine engine 104, as the operational rotor tip speed for each of the plurality of airfoils 112a, 112b in the axial stages 456a, 456b of the multistage axial-centrifugal compressor 102 is greater than or above the upper end of the threshold range value of 1400 ft/s, the controller 110 of the airfoil manufacturing determination system 200 determines that the plurality of airfoils 112a, 112b are to be manufactured according to the arbitrary manufacturing approach, which results in the plurality of airfoils 112a, 112b having the arbitrary shape or complex, unconstrained geometry. As the operational rotor tip speed for each of the plurality of airfoils 112c in the axial stage 456c of the multistage axial-centrifugal compressor 102 is less than or below the lower end of the threshold range value of 1250 ft/s, the controller 110 of the airfoil manufacturing determination system 200 determines that the plurality of airfoils 112c are to be manufactured according to the flank manufacturing approach, which results in the plurality of airfoils 112c having the straight-line shape or simple, constrained geometry. By determining to manufacture the airfoils 112a, 112b of the first axial stage 456a and the second axial stage 456b, respectively, according to the arbitrary manufacturing approach, and determining to manufacture the airfoils 112c of the third axial stage 456c according to the flank manufacturing approach, the compressor manufacturing system 100 reduces manufacturing costs, while optimizing performance of the gas turbine engine 104. In this regard, the compressor manufacturing system 100 may reduce manufacturing costs, while ensuring that a desired efficiency is achieved by the multistage axial-centrifugal compressor across the axial stages 456a-456c, which increases a performance of the gas turbine engine 104. In addition, the use of the flank manufacturing approach provides for improved manufacturing tolerances as the use of the flank manufacturing approach provides for substantially the same shape to be created each time, which also provides robustness to the rotor design.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A multistage axial-centrifugal compressor for a gas turbine engine, comprising:
   a first axial compressor stage including a first rotor mounted to a shaft, the first rotor having at least one airfoil with an arbitrary shape, and the arbitrary shape is an unconstrained shape in which at least 80% of a pressure side and a suction side of the at least one airfoil is configured to be formed by point milling based on an operational rotor tip speed of the first axial compressor stage as greater than a threshold range value;
   a second axial compressor stage including a second rotor mounted to the shaft, the first axial compressor stage upstream from the second axial compressor stage, the second rotor having at least one second airfoil with a straight-line shape in which at least 80% of a pressure side and a suction side of the at least one second airfoil is configured to be formed by flank milling based on the operational rotor tip speed of the second axial compressor stage as less than the threshold range value; and
   a centrifugal compressor stage downstream from the second axial compressor stage including an impeller assembly coupled to the shaft, the impeller assembly having at least one third airfoil with the straight-line shape,
   wherein the threshold range value is 1250 feet per second (ft/s) to 1400 feet per second (ft/s).

2. The multistage axial-centrifugal compressor of claim 1, further comprising:
   a third axial compressor stage including a fourth rotor mounted to the shaft, the third axial compressor stage upstream from the second axial compressor stage, the fourth rotor having at least one fourth airfoil with the arbitrary shape or at least one fourth airfoil with the straight-line shape based on the operational rotor tip speed of the third axial compressor stage.

3. The multistage axial-centrifugal compressor of claim 2, wherein the operational rotor tip speed of the third axial compressor stage is greater than the threshold range value and the fourth rotor has the at least one fourth airfoil with the arbitrary shape.

4. The multistage axial-centrifugal compressor of claim 2, wherein the operational rotor tip speed of the third axial compressor stage is less than the threshold range value and the fourth rotor has the at least one fourth airfoil with the straight-line shape.

5. The multistage axial-centrifugal compressor of claim 2, further comprising:
   a fourth axial compressor stage including a fifth rotor mounted to the shaft, the fourth axial compressor stage upstream from the second axial compressor stage and downstream from the third axial compressor stage, the fifth rotor having at least one fifth airfoil with the straight-line shape.

6. The multistage axial-centrifugal compressor of claim 1, wherein the first rotor and the second rotor are each integrally bladed rotor disks.

\* \* \* \* \*